(12) United States Patent
Dicken et al.

(10) Patent No.: US 9,692,198 B2
(45) Date of Patent: Jun. 27, 2017

(54) METHOD OF MANUFACTURING AN ELECTRICALLY CONDUCTIVE EXTENSION/COMPRESSION SPRING

(71) Applicant: Carleton Life Support Systems, Inc., Davenport, IA (US)

(72) Inventors: Lane Daniel Dicken, Long Grove, IA (US); Dennis Eugene Lund, Bettendorf, IA (US); Mark Russell Squires, Davenport, IA (US)

(73) Assignee: Carleton Life Support Systems, Inc., Davenport, IA (US)

(*) Notice: Subject to any disclaimer, the term of this patent is extended or adjusted under 35 U.S.C. 154(b) by 266 days.

(21) Appl. No.: 14/744,817

(22) Filed: Jun. 19, 2015

(65) Prior Publication Data

US 2015/0295377 A1 Oct. 15, 2015

Related U.S. Application Data

(62) Division of application No. 13/756,701, filed on Feb. 1, 2013, now Pat. No. 9,099,226, which is a division of application No. 12/618,281, filed on Nov. 13, 2009, now Pat. No. 8,378,218.

(51) Int. Cl.
| | |
|---|---|
| *H01F 7/06* | (2006.01) |
| *H01R 43/16* | (2006.01) |
| *H01R 13/24* | (2006.01) |
| *H01R 13/631* | (2006.01) |
| *H01B 13/00* | (2006.01) |
| *F16F 1/02* | (2006.01) |
| *H01R 13/62* | (2006.01) |

(52) U.S. Cl.
CPC ............. *H01R 43/16* (2013.01); *F16F 1/021* (2013.01); *H01B 13/00* (2013.01); *H01R 13/2421* (2013.01); *H01R 13/6315* (2013.01); *F25B 2309/001* (2013.01); *H01R 13/6205* (2013.01); *Y10T 29/4906* (2015.01); *Y10T 29/49071* (2015.01); *Y10T 29/49073* (2015.01); *Y10T 29/49117* (2015.01)

(58) Field of Classification Search
CPC ..... F16F 1/021; F16F 1/14; F16F 1/34; H01B 5/101; H01B 5/107; H01B 13/008; H01B 13/2421; H01B 13/6315; H01B 13/34; H01R 43/19
See application file for complete search history.

(56) References Cited

U.S. PATENT DOCUMENTS

| 4,719,683 A * | 1/1988 | Ulbing ....................... B21F 3/02 140/89 |
| 5,167,582 A * | 12/1992 | Hunt ......................... F16D 3/72 464/78 |
| 5,944,302 A * | 8/1999 | Loc ........................ F04B 35/045 267/180 |

(Continued)

*Primary Examiner* — Paul D Kim
(74) *Attorney, Agent, or Firm* — Woods Oviatt Gilman LLP; Katherine H. McGuire, Esq.

(57) ABSTRACT

An electrically conductive spring having first and second coils defining first and second electrical pathways for completing an electric circuit between two components which may move relative to each other. In one embodiment, the spring is a double start helical spring with first and second coils extending between respective, electrically insulated ends with the coils extending in alternating, spaced relation to each other.

1 Claim, 11 Drawing Sheets

(56) References Cited

U.S. PATENT DOCUMENTS

| | | | | |
|---|---|---|---|---|
| 6,193,225 | B1* | 2/2001 | Watanabe | F16F 1/043 |
| | | | | 267/167 |
| 6,236,145 | B1* | 5/2001 | Biernacki | H03H 9/0523 |
| | | | | 310/346 |
| 7,017,344 | B2* | 3/2006 | Pellizzari | F02G 1/0435 |
| | | | | 60/517 |
| 7,833,256 | B2* | 11/2010 | Biedermann | A61B 17/7004 |
| | | | | 606/300 |
| 8,186,060 | B2* | 5/2012 | Jee | B21F 35/00 |
| | | | | 29/896.9 |
| 2008/0295523 | A1* | 12/2008 | Dicken | F16F 1/125 |
| | | | | 62/6 |

* cited by examiner

METHOD OF MANUFACTURING AN ELECTRICALLY CONDUCTIVE EXTENSION/COMPRESSION SPRING

CROSS-REFERENCE TO RELATED APPLICATION

This is a divisional application of U.S. patent application Ser. No. 13/756,701, filed Feb. 1, 2013, (now U.S. Pat. No. 9,099,226, issued on Aug. 4, 2015), which is a divisional application of U.S. patent application Ser. No. 12/618,281, filed Nov. 13, 2009 (now U.S. Pat. No. 8,378,218, issued on Feb. 19, 2013).

BACKGROUND OF THE INVENTION

The present invention generally relates to electrically conductive springs useful in devices and assemblies requiring an electric pathway between spaced components. The invention more particularly relates to embodiments of such springs having at least two electrically conductive coils which establish an electric circuit between components such as a power source and a load which may move relative to the power source.

Many devices and assemblies are known which require wired electrical pathways between components. In some of these devices and assemblies, one or more of the components may move relative to the other in which case the electrical pathway must accommodate for the movement without breaking While a simple insulated wire or wire bundle may be sufficiently flexible to accommodate for the movement, for components that move frequently or constantly, and particularly those which move at a high frequency, the wires may quickly fatigue and break thereby causing an open circuit condition.

Figure 1:
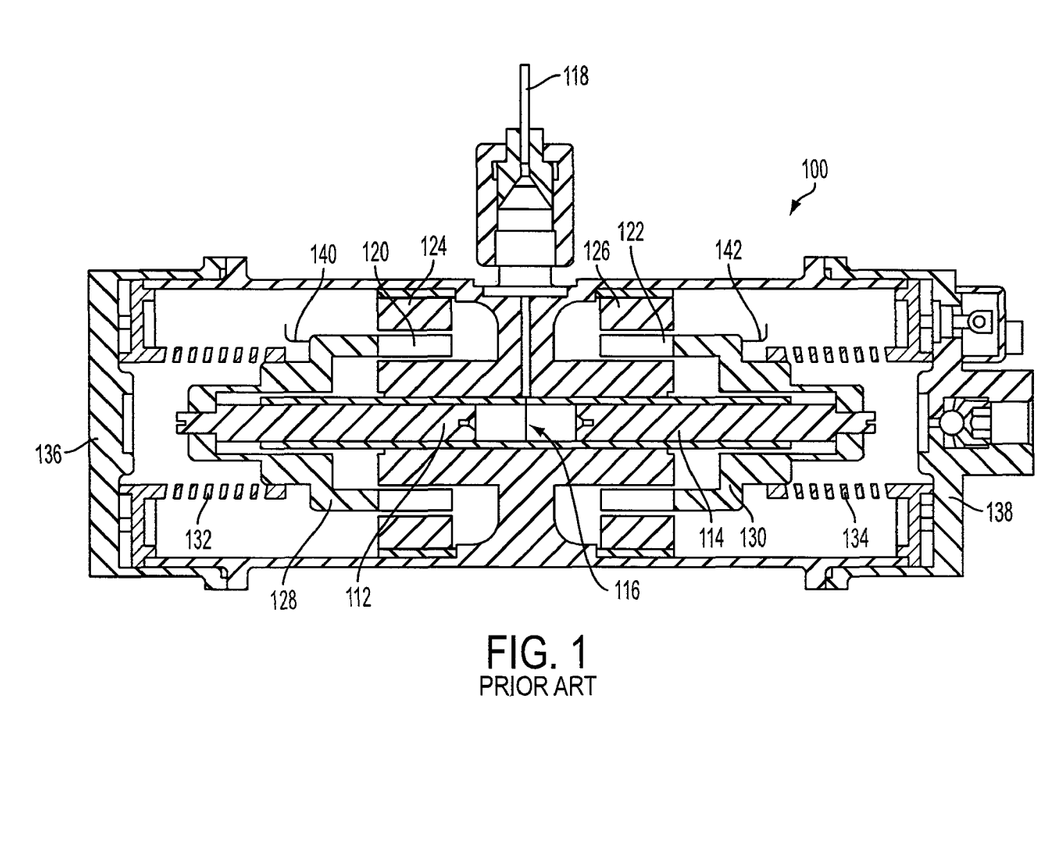
FIG. 1 is a longitudinal cross-sectional view of a prior art linear compressor in which the present invention is useful.

Although the present invention may be useful in any number of devices, one type of device requiring an electrically wired connection between movable components is a closed cycle cryogenic cooler which is commonly used to cool devices such as infrared detectors. There is seen in FIG. 1 a prior art linear compressor 100 having first and second pistons 112 and 114 which reciprocate toward and away from each other to compress a working gas within the space 116 between the piston heads. Movement of the pistons toward each other compresses the gas which is directed out of the compressor through gas line 118 to a working device such as an expander (not shown). The reciprocating movement of the pistons 112 and 114 is controlled through a motor coil 120 and 122, respectively, which, when energized, move relative to stationary magnets 124, 126, respectively. Pistons 112, 114 connect to coils 120, 122 via connecting elements 128, 130, respectively. Springs 132, 134 are provided between connecting elements 128, 130 and housing end walls 136, 138 to support and provide linear stability along the reciprocating paths of the pistons 112, 114, respectively. In order to provide electricity to motor coils 120, 122, respective electrical leads 140, 142 are provided which, although shown in fragmented view, must be connected to wiring which leads to an external power source (not shown). Since the motor coils are moving with their respective pistons, wire leads 140, 142 (and their associated wiring leading to the power source) undergo repetitive flexing eventually causing fatigue and possible breakage.

There therefore remains a need for an improved apparatus and method for establishing a durable flexible electric circuit between two or more components where one or more of the components is moving relative to the other, for example in a reciprocating motion along a linear path.

SUMMARY OF THE INVENTION

In a first aspect, the present invention addresses the above need by providing a spring which may be an extension/compression spring having two or more conducting coils each defining a discreet electrical pathway electrically insulated from each other. Although the spring may have any number of discrete coils and electrical pathways depending on the application in which it is to be used, in one embodiment, the spring is a double start helical spring having alternating, spaced first and second helical coils extending between first and second end wall portions thereof. Insulating material is placed between the end portions of each coil to electrically insulate the helical coils from each other.

In one embodiment, a cylinder of electrically conductive material is provided wherein first and second notches are machined into each end of the cylinder. Insulating components are positioned within each notch and the cylinder body is then further machined to form the first and second alternating, spaced coils with the insulating components positioned to electrically insulate the first coil from the second coil.

In another embodiment, the first and second coils are machined first from a cylinder of electrically conductive material with the first and second coils separated and subsequently attached to first and second insulating components at each end of the coils.

Electrical contacts are connected to the ends of the first and second coils to establish an electric circuit between components to which the spring is attached at either end. For example, one end of the spring may be connected to a load and the opposite end of the spring may be connected to a power source. Since the coils of the spring are electrically insulated from each other, the first coil of the spring provides the electrical connection from the power source to the load while the second coil provides the return electrical path from the load back to the power source. The spring easily translates between extension and/or neutral and/or compression to accommodate any movement of the load relative to the power source within the tolerances of the spring, while at the same time providing the electrical connection therebetween.

In yet another embodiment of the invention, a primary spring and a secondary spring are provided in spaced, parallel relationship with the primary spring providing one electrical path and the secondary spring providing the second electrical path to complete the circuit between components such as a power source and a load to which opposite ends of the springs are connected. If additional electrical pathways are required, additional conducting springs may be provided in alternating, spaced relationship with one or both of the primary and secondary springs to form a spring as in the first embodiment, or positioned in spaced, parallel relationship to the primary and secondary springs. The multiple springs translate together and provide an electric circuit between components such as a power source and load wherein the components to which the spring is connected may move relative to each other.

In yet another embodiment of the invention, at least first and second coils of differing diameters are provided in coaxial, radially spaced relationship. One or both of the coils may include additional coils of the same diameter in alternating, spaced relationship as in the first embodiment. Appropriate electrical contacts are provided on the springs to establish an electric circuit between moving components such as a power source and a load moving relative to the power source.

In a second aspect, the invention provides a method of manufacturing an electrically conductive extension/compression spring comprising the steps of:
a. roviding a cylinder of electrically conductive material having first and second, opposite end walls;
b. forming first and second notches in said first end wall thereby defining first and second end wall segments;
c. forming third and fourth notches in said second end wall thereby defining third and fourth end wall segments;
d. providing electrical insulating components within said first and second notches and thereby electrically insulating said first and second end wall segments from each other, and providing electrical insulating components within said third and fourth notches and thereby electrically insulating said third and fourth end wall segments from each other; and
e. machining first and second alternating, spaced coils into said cylinder with said first coil having coil turns extending between and defining a first electrical path between said first and third wall segments, and said second coil having coil turns extending between and defining a second electrical path between said second and fourth wall segments, said first electrical path electrically insulated from said second electrical path.

In another embodiment, the invention provides a method of manufacturing an electrically conductive extension/compression spring comprising the steps of:
a. providing a cylinder of electrically conductive material having first and second end walls;
b. machining said cylinder into separate first and second coils each having coil turns extending between respective first and second ends;
c. providing first and second electrical insulating components; and
d. connecting said first and second coils to said first and second electrical insulating components with said first coil turns alternating in spaced relation between said second coil turns and said first and second ends of said first coil aligned with said first and second ends of said second coil, respectively, said first electrically insulating component electrically insulating said first ends of said first and second coil, and said second electrically insulation component electrically insulating said second ends of said first and second coils and thereby electrically insulating said first and second coils from each other.

BRIEF DESCRIPTION OF THE DRAWINGS

FIG. 10 is an enlarged, fragmented view of the right side of the compressor of

FIG. 9 rotated to show the electrical connection between the spring of the invention and the motor coil.

DETAILED DESCRIPTION OF PREFERRED EMBODIMENT

Figure 2A:
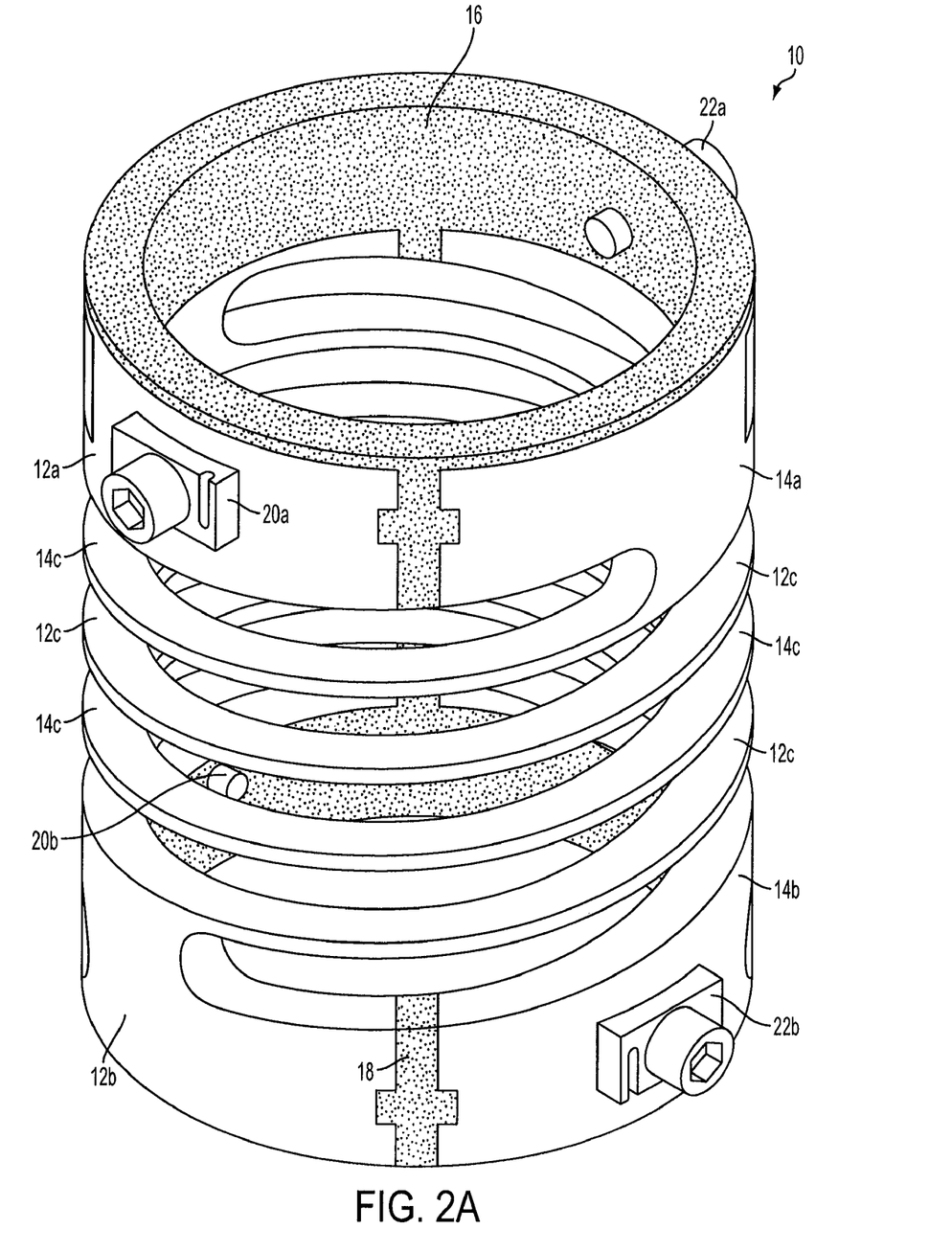
FIG. 2A is an enlarged, perspective view of one embodiment of the present invention.
Figure 2B:
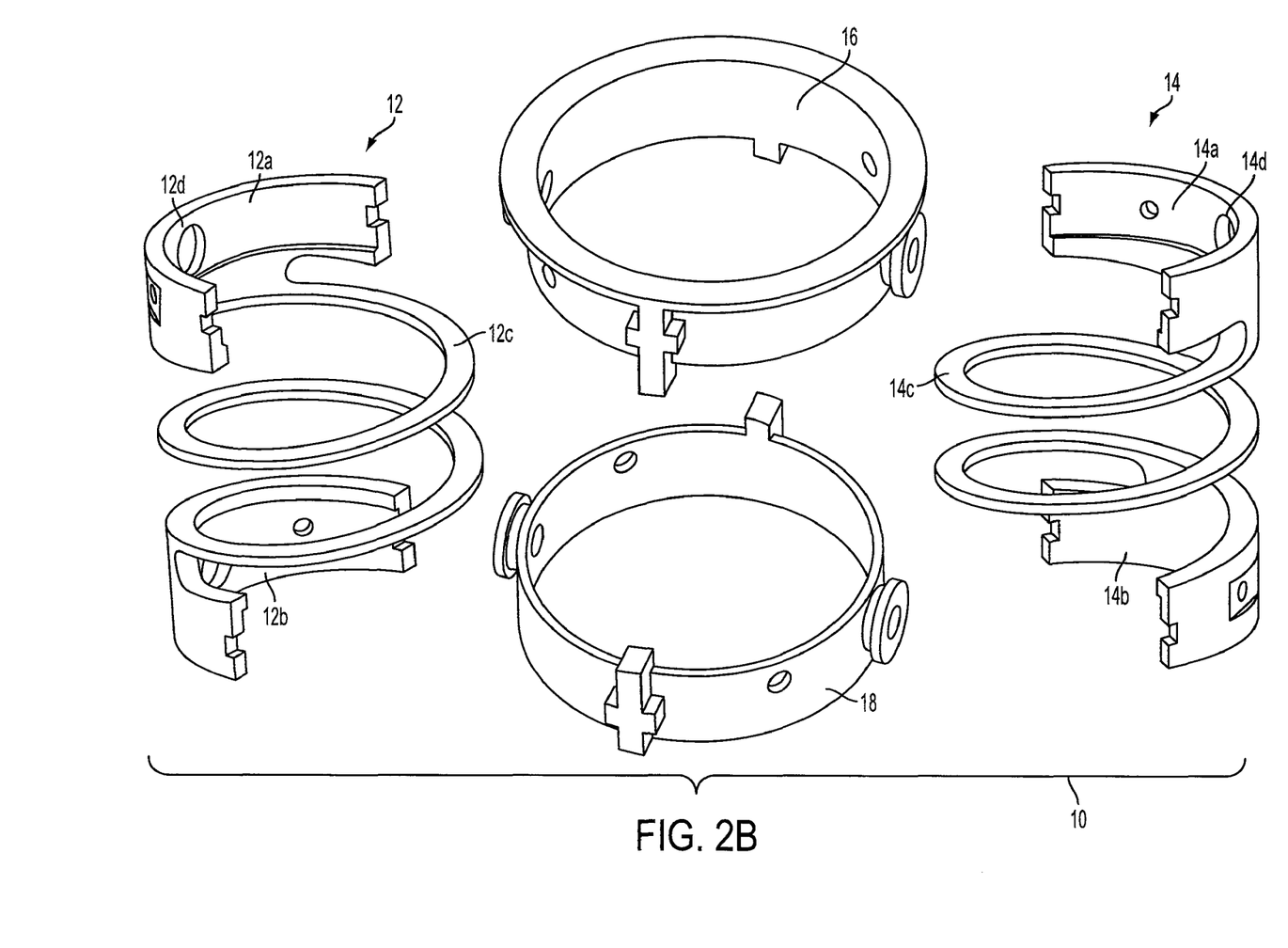
FIG. 2B is the spring of FIG. 2A in exploded perspective view.

Referring now the drawing, a first embodiment of the present invention is seen in FIGS. 2A and 2B to comprise an electrically conductive, extension/compression spring 10 having two or more conducting coils each defining a discreet electrical pathway electrically insulated from each other. Although the spring may have any number of discrete coils and electrical pathways depending on the application in which it is to be used, in the embodiment of FIGS. 2A and 2B spring 10 is a double start spring having first and second helical coils 12 and 14 extending in alternating, spaced relation between first and second ends 12a,b and 14a,b thereof, respectively. First and second insulating components 16, 18 are placed between the ends of each coil 12 and 14 to electrically insulate the respective coil turns 12c and 14c from each other. In this embodiment, first and second coils 12, 14 are first machined from a cylinder of electrically conductive material with the first and second coils 12, 14 separated as seen in FIG. 2B, and subsequently attached to first and second insulating components 16, 18 at the first and second ends end 12a,b and 14a,b of the coils 12, 14, respectively.

The invention further provides a method of manufacturing an electrically conductive extension/compression spring comprising the steps of:
a. providing a cylinder 28 of electrically conductive material having first and second end walls 28a,b (see FIG. 6A);
b. machining separate first and second coils 12, 14 from said cylinder with said first coil having first coil turns 12c extending between and defining a first electrical path between first and second end walls 12a, 12b of said first coil, and said second coil 14 having second coil turns 14c extending between and defining a second electrical path between first and second end walls 14a, 14b of said second coil;
c. providing first and second electrical insulating components 16,18, respectively; and
d. attaching said first end walls 12a, 14a of said first and second coils to said first electrically insulating component 16, and attaching said second end walls 12b, 14b of said first and second coils to said second electrically insulating component 18 with said first coil turns in alternating, spaced relation to said second coil turns,
e. whereby said first electrically insulating component 16 electrically insulating said first end walls 12a, 14a of said first and second coil, and said second electrically insulation component 18 electrically insulating said second end walls 12b, 14b of said first and second coils and thereby electrically insulating said first and second coils.

Figure 5:
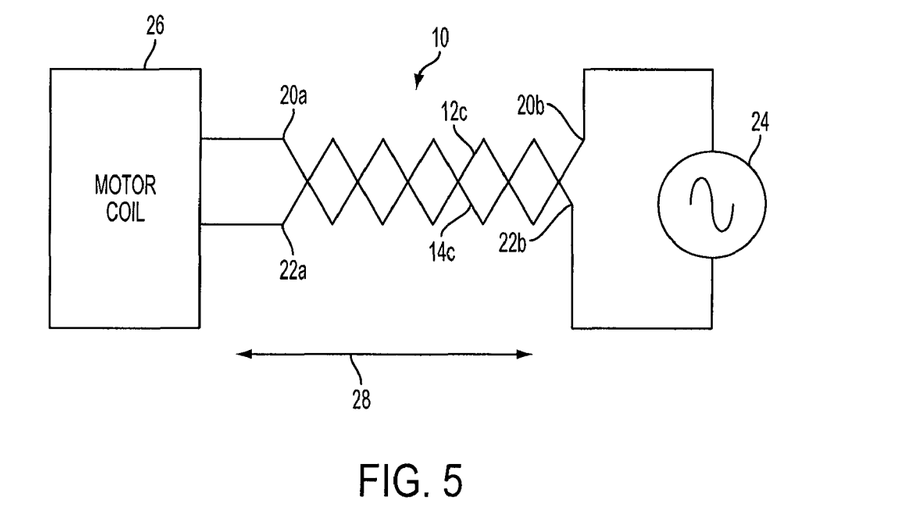
FIG. 5 is a simplified schematic showing one possible operational assembly utilizing the invention.

Electrical contacts 20a,b and 22a,b are connected to the first and second coil ends 12a,b and 14a,b, respectively, to provide electrical connection between two components which move relative to each other. For example, as seen in FIG. 5, spring 10 may be connected to a first component which may be a power source 24, for example, via contacts 20a and 22a, and a second component which may be a load such as a motor coil 26 via contacts 20b, 22b. The first coil 12 of the single spring 10 thus provides the electrical connection from the power source 24 to the motor coil 26 while the second coil 14 provides the return electrical path from the motor coil 26 back to the power source 24. The spring 10 easily translates between extension and/or neutral and/or compression as represented by arrow 28 to accommodate movement of the motor coil 26 relative to the power source 24 while at the same time providing the electrical connection therebetween.

Figure 6A:
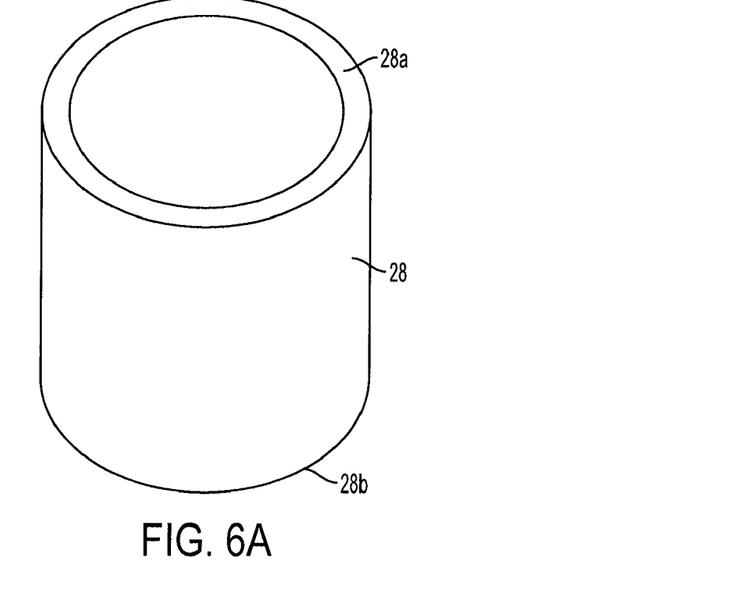
FIG. 6A is a perspective view of an embodiment of a cylinder blank useful in making the present invention.
Figure 6B:
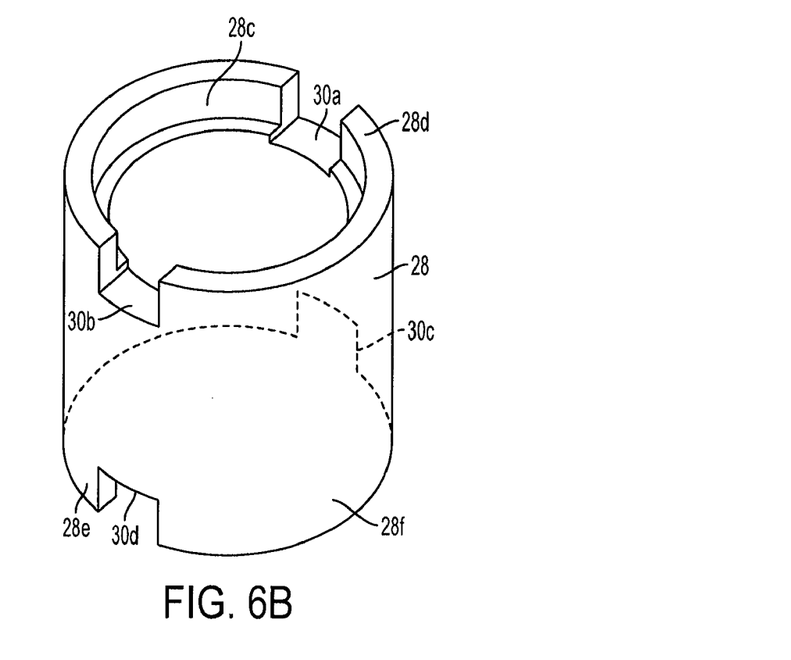
FIG. 6B is the view of FIG. 6A showing insulation notches formed therein and prior to machining of the coils.
Figure 7:
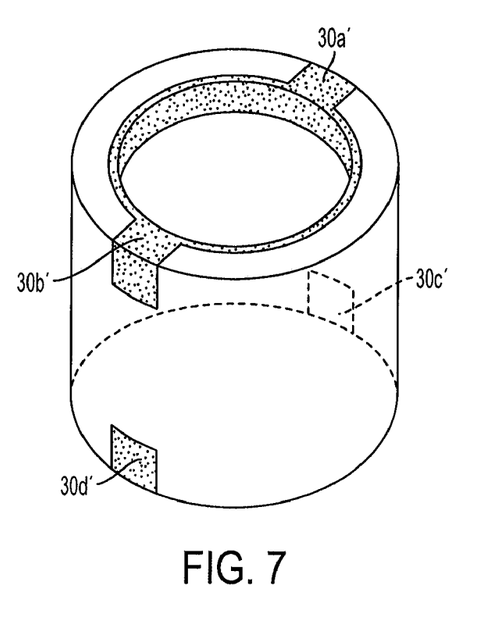
FIG. 7 is the view of FIG. 6B showing insulation inserted within the notches.
Figure 8:
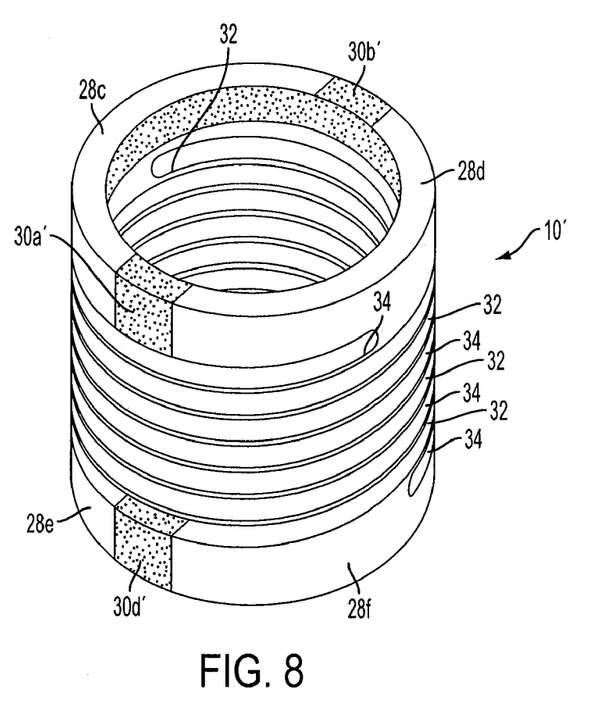
FIG. 8 is the view of FIG. 7 showing formation of first and second coils within the cylinder.

FIGS. 6-8 illustrate an alternate method of manufacturing spring 10' comprising the steps of:
 a. providing a cylinder 28 of electrically conductive material having first and second, opposite end walls 28a,b (see FIG. 6A);
 b. forming first and second notches 30a,b in said first end wall 28a thereby defining first and second end wall segments 28c,d (see FIG. 6B);
 c. forming third and fourth notches 30c,d in said second end wall 28b thereby defining third and fourth end wall segments 28e,f;
 d. providing electrical insulating components 30a',b' within each of said first and second notches 30a,b and thereby electrically insulating said first and second end wall segments 28c,d from each other, and providing electrical insulating components 30c',d' within each of said third and fourth notches 30c,d and thereby electrically insulating said third and fourth end wall segments 28e,f from each other (see FIG. 7); and
 e. machining first and second coil turns 32, 34 in alternating, spaced relation into said cylinder 28 with said first coil turns 32 extending between and defining a first electrical path between said first and third wall segments 28c, 28e, and said second coil turns 34 extending between and defining a second electrical path between said second and fourth wall segments 28d, 28f, said first electrical path being electrically insulated from said second electrical path.

Figure 3:
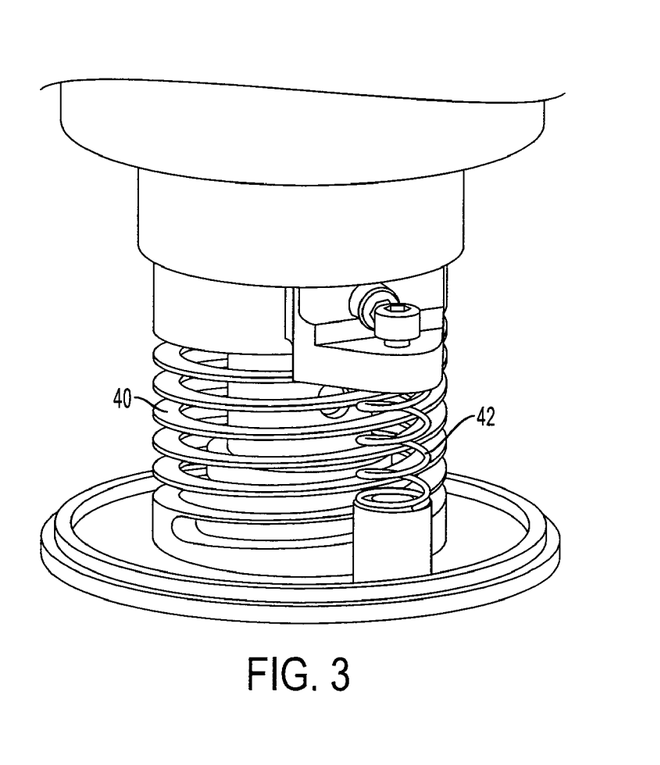
FIGS. 3 and 4 are perspective views of alternate embodiments of providing an electrical circuit between components.

In yet another embodiment of the invention seen in FIG. 3, a single start primary spring 40 and a secondary spring 42 are provided in spaced, parallel relationship with the primary spring 40 providing one electrical path and the secondary spring 42 providing the second electrical path to complete a circuit between two components such as a power source and a load between which the springs 40 and 42 are connected. If additional electrical pathways are required, additional conducting coils may be provided in coaxial, alternating relationship to one or both of the primary and secondary springs as in spring embodiments 10,10', or positioned in spaced, parallel relationship to the primary and secondary springs 42. The multiple springs translate together and provide an electric circuit between two components such as a power source and load which is moving relative to the power source as seen in FIG. 5.

Figure 4:
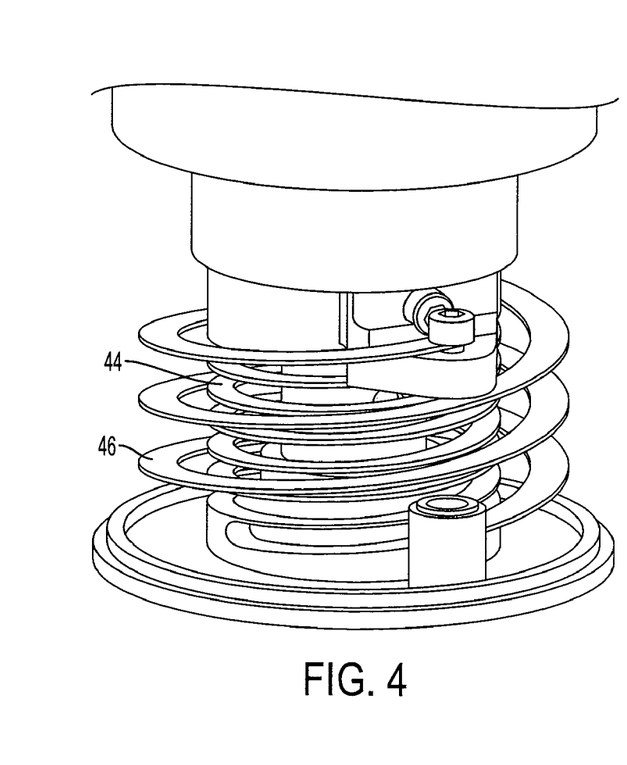

In yet another embodiment of the invention seen in FIG. 4, first and second coils 44, 46 of differing diameters are provided in coaxial, radially spaced relationship and provide discrete, electrically insulated pathways between two components between which springs 44, 46 are connected. If further electrical pathways are required, one or both of the coils 44, 46 may include additional coils of the same diameter in coaxial, alternating relationship as in spring embodiments 10, 10', and/or an additional coil or wire may be connected in radially spaced relation in the same manner as coil 42 seen in FIG. 3.

In all embodiments, any type of appropriate electrical connection is provided, e.g., direct solder, terminal lugs or soldering wires to electrical contacts which are fastened to the ends of the springs, to establish an electric circuit between any two components requiring a flexible yet durable electric circuit to be established between two components such as a power source and a load moving relative to the power source as seen in FIG. 5.

Figure 9:
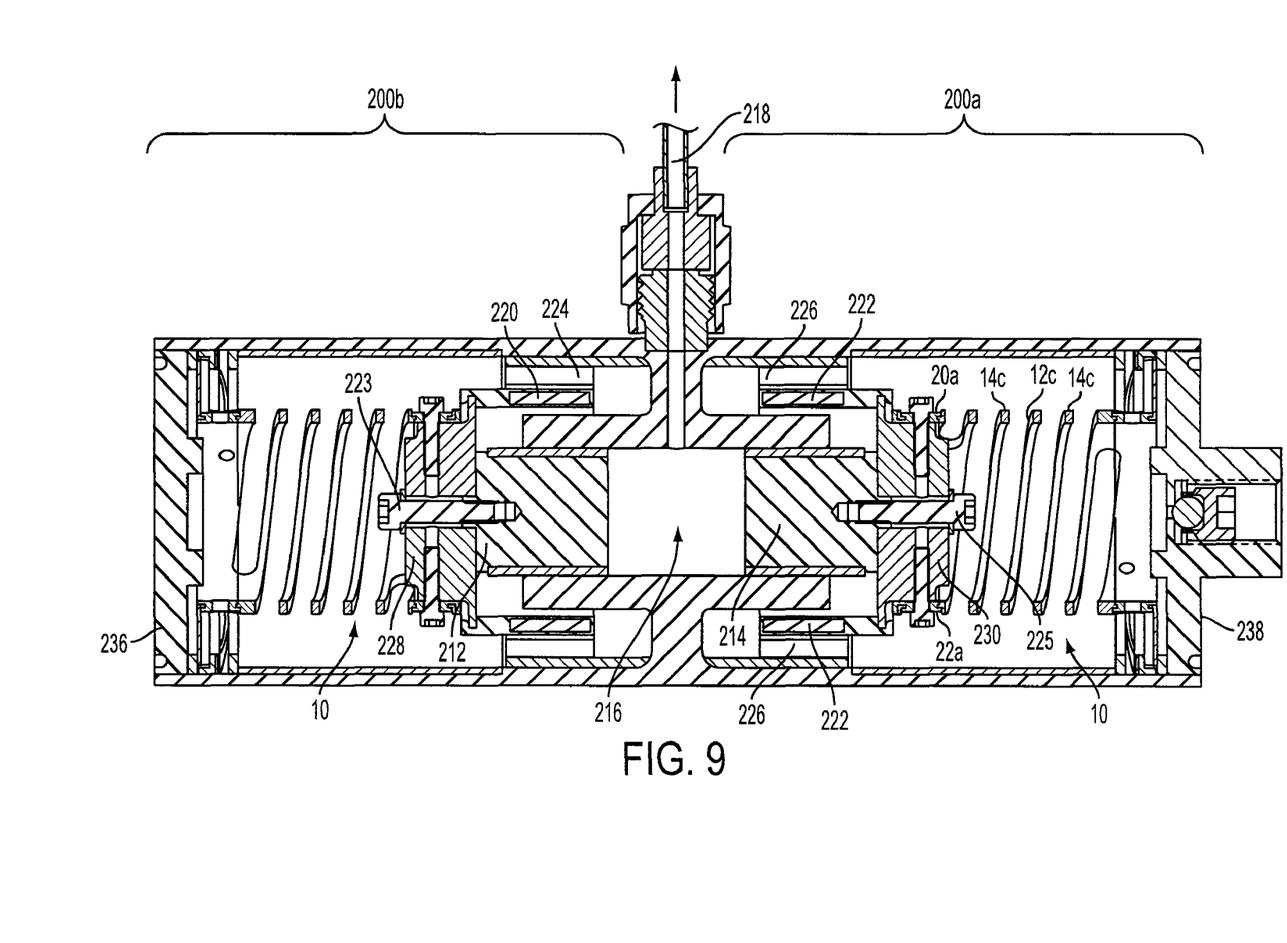
FIG. 9 is a longitudinal cross-section view of a linear compressor incorporating an embodiment of the present invention.
Figure 10:
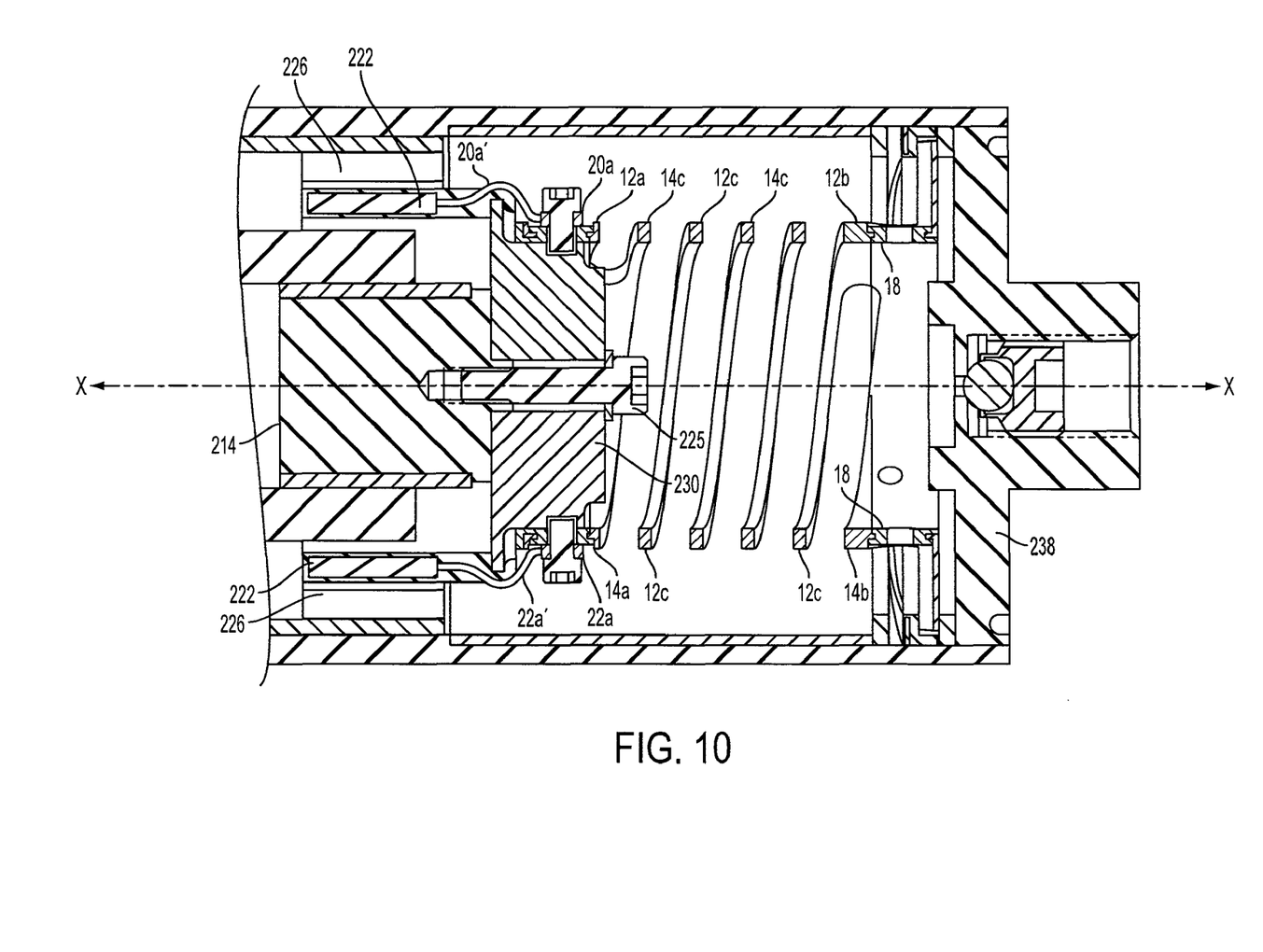
Figure 11:
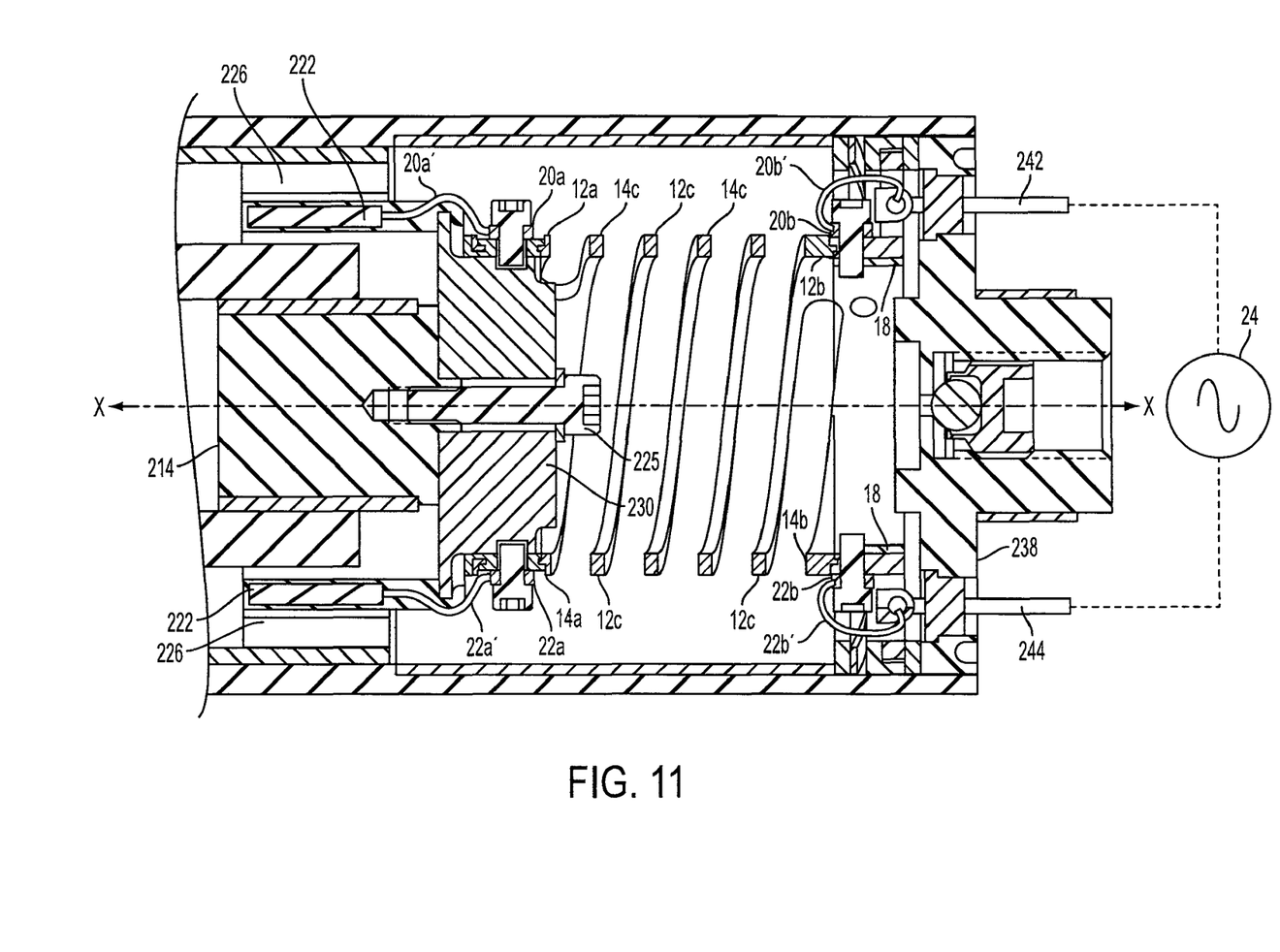
FIG. 11 is the view of FIG. 10 rotated to show the electrical connection between the spring of the invention and the leads extending exteriorly of the compressor housing for connection to a power source (not shown).

As explained in the Background of the Invention, one type of device requiring an electrically wired connection between movable components is a closed cycle cryogenic cooler which is commonly used to cool devices such as infrared detectors. FIGS. 9-11 illustrate an embodiment of the inventive spring incorporated into a compressor 200 of a closed cycle cryogenic cooler. It is understood that the right side of compressor 200a is a mirror image of the left side 200b and therefore description of components and operation with respect to one side is understood to be equally applicable to the other side and the following description will at times mainly focus on the right side 200a.

Compressor 200 includes first and second pistons 212 and 214 which reciprocate toward and away from each other to compress a working gas within the space 216 between the piston heads. Movement of the pistons toward each other compresses the gas which is directed out of the compressor through gas line 218 to a working device such as an expander (not shown). The reciprocating movement of the pistons 212 and 214 is controlled through a motor coil 220 and 222, respectively, which, when energized, move relative to stationary magnets 224, 226, respectively. Pistons 212, 214 connect to motor coils 220, 222 via connecting elements 228, 230, respectively, via suitable securing elements such as bolts 223, 225, for example. As discussed with reference to the prior art seen in FIG. 1, springs are normally provided between the connecting elements 228, 230 and housing end walls 236, 238 to support and provide linear stability along the reciprocating paths of the pistons 212, 214, respectively. The present invention modifies these springs so that they act to complete an electric circuit between the motor coils 220, 222 and a power source 24 (e.g., a sine wave generator such as a 0-15 V $AC_{RMS}$) to which compressor 200 is connected via electrically conductive feed-through headers 242, 244 seen in FIG. 11.

Spring 10 (or any other embodiment of the inventive spring described and claimed herein) is attached to connecting element 230 with any suitable fastener such as screws 231 which may be passed through aligned openings in the spring 10, insulating components 16,18 and connecting element 230 (see, for example, openings 12d, 14d in FIG. 2B). As seen in FIG. 10, spring coils 12c and 14c electrically connect to motor coil 222 via electrical contacts 20a and 22a and wires 20a' and 22a', respectively. As seen in FIG. 11, which is rotated approximately 90 degrees with respect to FIG. 10, spring coils 12c and 14c electrically connect at the other end of spring 10 to feed-through headers 242 and 244 via electrical contacts 20b and 22b and wires 20b' and 22b', respectively. As discussed above, feed-through headers 242 and 244 connect to a power source schematically indicated at 24 in FIGS. 5 and 11.

It will thus be appreciated spring 10 acts as a flexible electrical connection between two components which may move relative to each other such as a power source 24 and a load (motor coil) 222. When energized, motor coil 222 reciprocates along longitudinal axis x-x. Since piston 214 is connected to motor coil 222 via connecting element 230, piston 214 reciprocates together with motor coil 222. In the embodiment of spring 10 and 10', a single spring formed of equal or near equal diameter, interleaved, spaced coils 12c and 14c provide separate conducting paths to complete the electric circuit between the power source and the motor coils. The spring end walls 12a, 14a are together mounted in fixed relation to housing end wall 238 which remains stationary with respect to reciprocating piston 214 and motor coil 222. Since opposite spring end walls 12a and 14a are fixed to connecting element 240 which is fixed to motor coil 222, end walls 12a, 14a move together therewith and, as such, wires 20a' and 22a' which interconnect motor coil 222 and contacts 20a, 22a, also move therewith and do not undergo repeated flexing and straightening as occurred with prior art wires 140, 142 which extended to the exteriorly positioned stationary power source to complete the electrical circuit.

Conversely, in the present invention, the separate coils 12c, 14c of spring 10 (or other spring embodiment) provide a flexible electrical connection between the moving motor coil 222 and stationary power source 26. Since the electrical connection is now provided by spring coils 12c, 14c which may easily move between compressed, neutral and extended positions, the premature wear issues of the prior art are eliminated and the life of the device is extended significantly.

What is claimed is:

1. A method of manufacturing an electrically conductive extension/compression spring comprising the steps of:
    a) providing a cylinder of electrically conductive material having first and second end walls;
    b) machining said cylinder into separate first and second coils each having coil turns extending between respective first and second ends;
    c) providing first and second electrical insulating components; and
    d) connecting said first and second coils to said first and second electrical insulating components with said first coil turns alternating in spaced relation between said second coil turns and said first and second ends of said first coil aligned with said first and second ends of said second coil, respectively, said first electrically insulating component electrically insulating said first ends of said first and second coil, and said second electrically insulation component electrically insulating said second ends of said first and second coils and thereby electrically insulating said first and second coils from each other.

* * * * *